Figure 1:
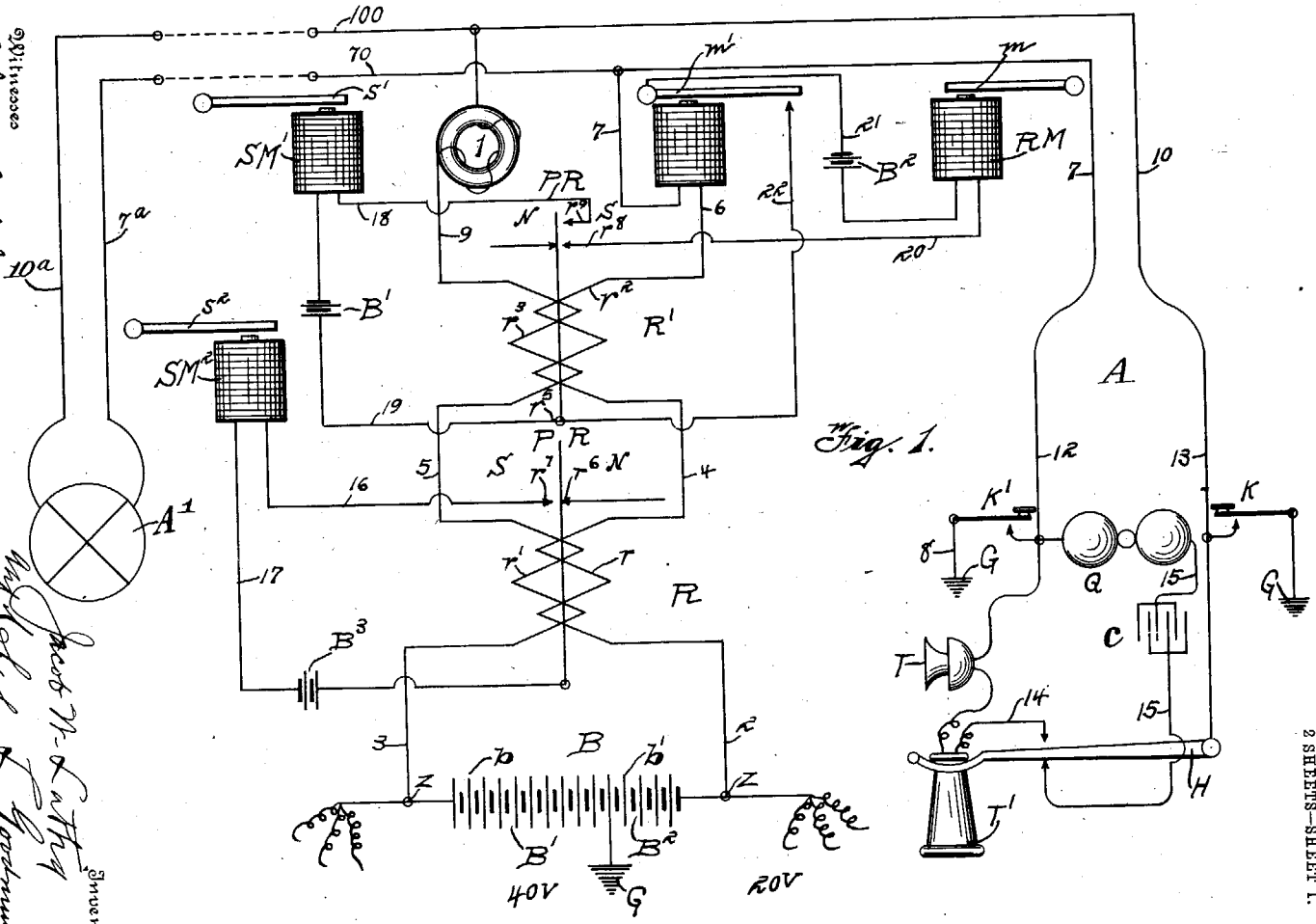

J. W. LATTIG & C. L. GOODRUM.

AUTOMATIC TELEPHONE EXCHANGE SYSTEM.

APPLICATION FILED JUNE 29, 1909.

Reissued June 2, 1914.

13,742.

2 SHEETS—SHEET 1.

Witnesses

Oliver T. Clarke

Chas. J. Welch

Inventors

Jacob W. Lattig and Charles L. Goodrum

By Stanley Bowman

Attorneys

J. W. LATTIG & C. L. GOODRUM.

AUTOMATIC TELEPHONE EXCHANGE SYSTEM.

APPLICATION FILED JUNE 29, 1909.

Reissued June 2, 1914.

13,742.

2 SHEETS—SHEET 2.

Witnesses

Oliver T. Clarke

Chas. F. Mich

Inventors

Jacob W. Lattig and Charles L. Goodrum

By Stacy & Brosman

Attorneys

UNITED STATES PATENT OFFICE.

JACOB W. LATTIG, OF GLENSIDE, PENNSYLVANIA, AND CHARLES L. GOODRUM, OF URBANA, OHIO, ASSIGNORS, BY MESNE ASSIGNMENTS, TO WESTERN ELECTRIC COMPANY, OF NEW YORK, N. Y., A CORPORATION OF ILLINOIS.

AUTOMATIC TELEPHONE-EXCHANGE SYSTEM.

13,742. Specification of Reissued Letters Patent. Reissued June 2, 1914.

Original No. 920,350, dated May 4, 1909, Serial No. 173,400½. Application for reissue filed June 29, 1909. Serial No. 505,111.

*To all whom it may concern:*

Be it known that we, JACOB W. LATTIG, a citizen of the United States, residing at Glenside, in the county of Montgomery and State of Pennsylvania, and CHARLES L. GOODRUM, a citizen of the United States, residing at Urbana, in the county of Champaign and State of Ohio, have invented certain new and useful Improvements in Automatic Telephone-Exchange Systems; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to automatic exchange systems comprising that class of telephone systems wherein no operators are required to manually make connections and clear out the same, this work being done entirely by mechanisms located at a central office and controlled by transmitting mechanism at the subscribers' stations. Heretofore it has been found difficult to arrange systems of this class to operate without individual batteries, and to centralize, as well as unify the sources of energy as has been done in connection with manually operated equipments.

It is the object of our invention to produce an automatic telephone system using centralized battery, whence energy may be derived for selective purposes and for the transmitters, and also a centralized source of ringing current automatically controlled.

It will be understood that the principles underlying our present invention may be applied to any automatic exchange system, the fundamental or basic requirements being the same in every case, viz: that the subscriber may be able to produce current impulses or variations in his circuit to effect relays or controlling magnets to produce a conjunction of connecting apparatus from his own line terminal to that of the line wanted. The invention is applicable to such systems as the Strowger automatic, which is now in commercial use, and which employs first and second selector and connector switches adapted to be successively operated in setting up a connection by grounding the opposite sides of the line at a subscriber's station substantially as set forth in the Haddon English Patent No. 18747 of 1902. We show herein however, a skeleton outline of a system and apparatus which may be taken as typical only, conventional form being used for the switches.

Our invention consists in the various devices and circuits hereinafter described and particularly pointed out in the claims. In carrying out our invention in the form herein illustrated we employ two differently wound selective relays, and a neutral restoring relay which acts in conjunction with one of them; together with a main battery at the central office connected in parallel through the differential relays to the various lines entering the exchange. This battery is grounded at a point intermediate of its end cells and nearer to one end than the other, so that as between the ground and one line wire there will be a greater potential difference than exists between the ground and the other wire of the metallic circuit. By providing the subscriber with grounding keys or their equivalents in his selector, he may manipulate the differential relays and the neutral relay by throwing stronger or weaker currents as the case may be on one and the other side of his line. During a connection the main battery is bridged across the connected circuits through the differential relays, and no effect is produced upon the connecting or disconnecting magnets until the subscriber hangs up and intentionally restores.

Our invention is illustrated in the accompanying drawings wherein—

Figure 2:
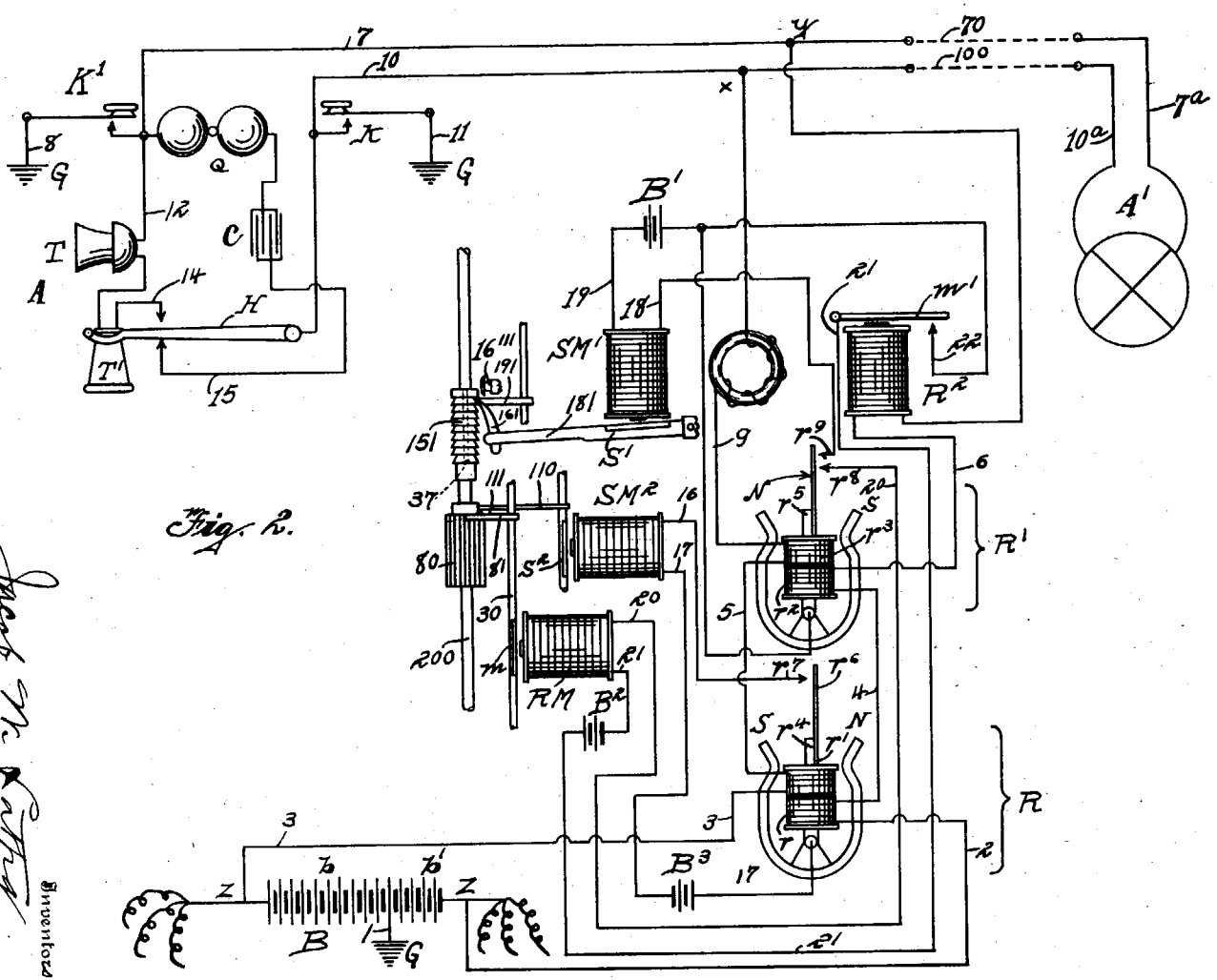

Figure 1 is a diagrammatic view of a system embodying the invention, and Fig. 2 is a similar view illustrating the system as applied to control the movements of the switch mechanism of the aforementioned Strowger automatic system.

Similar reference characters in the several figures indicate similar parts.

To facilitate an understanding of the operation and function of the various parts of a system embodying our invention we have illustrated it in connection with one of the several types of switches employed in connection with the Strowger automatic telephone system, a complete description of which appears in English Patent No. 18747 of 1902 to Haddon. However, as our present invention relates to means for controlling the operation of the switch we have only shown the parts of said switch with which said means coöperate, it being understood that the remaining parts thereof such as those connecting different telephone lines, operate as described in the aforementioned patent.

The operating mechanism of the switch shown in Fig. 2, comprises a main operating shaft 200 which is so supported that it is normally free to both revolve and slide longitudinally. Secured to the shaft 200 is an enlongated ratchet wheel 80 having teeth so arranged on the main portion thereof that by virtue of a magnet, a lever 110 and pawl 111, the shaft may be revolved in one direction step by step. There is a detent 8′ which serves to retain the ratchet wheel in position after each successive thrust of pawl 111. Secured to the shaft 200 is a ratchet cylinder 151 provided with circumferential teeth racked in one direction which may be engaged at any point by a pawl 161 when impelled by virtue of a magnet through a lever 181, this being the means of imparting a longitudinal step by step movement to the shaft 200. There is a post 16‴ which serves the double purpose of a stop, against which the free end of pawl 161 contacts to limit its movement and also to hold the pawl in inoperative position when the shaft 200 is to be returned to its normal position, as will be understood. There is a detent 191 for retaining the ratchet cylinder 151 with the shaft 200 in the desired position after the thrust of the pawl 151. A groove 37 (shown in dotted lines) is cut at one side of the ratchet cylinder 151 so that when the latter is in one position, the stop pawl 191 is out of engagement with the notches of ratchet 151, which permits of a free longitudinal movement of the shaft 200 in either direction. The detent 8′ is attached to an oscillatory shaft 30 and is rocked out of engagement with the ratchet wheel 80 to release it at the proper time.

A and A′ are two subscribers' stations, connected with the central office by the line wires 7—10, and $7^a$ and $10^a$, respectively, the latter being the station connected by the mechanism operated by the switch shaft 200. At each station we provide the usual apparatus for talking, comprising the transmitter T and the receiver T′, together with a ringer Q. The bridge 14 containing the talking set is normally open at the switch hook, while the bridge 15 containing the ringer Q and a condenser C is normally closed at the switch hook. In addition to this apparatus we provide each line wire with a grounding key which may be a plain key or push button as shown at K—K′, or may be a spring contact or the like controlled by suitable mechanism for transmitting selective impulses.

The main battery B may conveniently be composed of thirty cells of accumulator, giving about sixty volts between the end terminals, and we divide it into two portions by the ground wire 1, with ten cells on one side and twenty on the other, so that the portion $b$ will give forty volts and the portion $b'$ will give twenty volts.

In the diagrammatic illustration SM′ and $SM^2$ are the selector magnets of a Strowger central office apparatus. Assuming the subscriber whose line is shown in the figure to be connected with a one hundred line exchange, these magnets by coöperative effects determine the position of the mechanical switch arm connected to the shaft 200 constituting his line terminal, with respect to any of the hundred pairs of contacts in his selector switch by the conjoint operation of moving said shaft longitudinally and rotating it. In order to control these movements and this position of the switch arm the subscriber must be able to energize either or both of these magnets as occasion may require.

RM is the usual restoring magnet of the Strowger system. When this magnet is energized the switching mechanism is permitted to return to an inoperative or zero position.

R and R′ are two differential relays, which may be of any convenient type. Each relay is permanently polarized and has a soft iron pivoted armature adapted to move one way or the other between the polar extremities N and S as it is polarized one way or the other by current in its respective windings. The armature $r^4$ of relay R has windings $r$ and $r'$, and operates contacts $r^6$ and $r^7$. The other relay R′ has windings $r^2$ and $r^3$ upon its armature $r^5$ which is adapted to close upon contacts $r^8$ and $r^9$. A neutral relay $R^2$ is connected in series with the winding $r^2$ of the relay R′, and as it is desired to have the windings on both sides of each relay maintained in a balanced condition, an impedance coil I is included in series with the other winding $r^3$, being given the same resistance and the same magnetic coefficients as the relay $R^2$.

Line wire 7 has the grounding key K′, and line wire 10 has a similar grounding key K. Line wire 7 passes to the central office and there is connected in series through and with the relay $R^2$, the winding $r^2$ of relay R′, the winding of $r$ of relay R, one division $b'$ of the main battery B and to ground. Line wire 10 likewise passes to the central office and there in series to and through the impedance coil I the winding $r^3$ on relay R′ the winding $r'$ on relay R, and the other division $b$ of the main battery B and so to ground. The selector magnet SM′ is connected with the local circuit 18—19 containing a battery B′ and controlled by the armature $r^5$ and contact $r^9$. The magnet $SM^2$ is included in the local circuit 16—17 with the battery $B^3$ and controlled by the armature $r^4$ working on contact $r^7$. The restoring magnet RM is included in the local circuit 20—21—22 including a battery $B^2$ and controlled at two points, one by the armature $m'$ of the relay $R^2$, and the other by the armature $r^5$ of the relay R′, working on the contact $r^8$.

We will now give the operation of the apparatus so far described, assuming the system to be completed by the addition of all the required Strowger apparatus, as shown in English Patent No. 18747—92. With such apparatus three movements or acts are necessary, involving impulses over the subscriber's two line wires and the ground or return wire. It is of course understood that in all common battery telephone transmission there must be a constant difference of potential between the two wires, and between the terminals of each transmitter; and in our system we must maintain this condition, and in addition we must do so without interfering with the consummation of the three acts, and without permitting them to interfere with the constant potential differences. Movements Nos. 1 and 2 may be designated as selector and connector movements, being performed by the magnets SM′ and $SM^2$. These may of course be continued from one selector to another indefinitely, as will be fully understood by those skilled in the art and familiar with the Strowger system. Movement or act No. 3 is the releasing movement to which we have referred and is performed by the magnet RM. Upon inspection of the diagrams it is apparent at a glance that the main battery B is bridged to maintain a constant potential difference between the line wires 7 and 10. Supposing now the subscriber in calling desires to make the first selector movement; he depresses key K, which completes a circuit from ground at the subscriber's station by wire 11 to key K, wire 10, impedance coil I, wire 9, winding $r^3$, wire 5, winding $r'$, wire 3, battery division $b$, wire (1) and ground. The direction of the current flowing in this circuit is such that the armature $r^5$ of the relay R′ will be properly polarized to close upon its contacts $r^8$ and $r^9$; but the relay R will not operate, being oppositely polarized. The operation of relay R′ closes the circuit 18—19 containing the magnet SM′, whereupon this magnet is energized by current from battery B′ and makes the first step in the selection, which may be repeated as often as desired by the continued manipulation of the subscriber's key K. It will be observed that when the armature $r^5$ closes the circuit 18—19 it also closes its break in the circuit 20—21—22 containing the release magnet RM. The latter does not become energized, however, because the second break at $m'$ is not closed, the neutral magnet $R^2$ being connected with the line wire 7 and therefore receiving no current. The second movement is attained by the use of the key K′, whose depression produces a closure of a circuit from the ground by wire 8, key K′, wire 7, magnet $R^2$, wire 6, winding $r^2$, wire 4, winding $r$, wire 2, battery division $b'$, wire (1) and ground. Current flowing through this circuit from the battery division $b'$ is opposite in direction to that previously traced, and it finds the armature $r^4$ properly polarized to respond by closing the circuit 16—17 containing the second magnet $SM^2$, whose armature $s^2$ performs the second or connective act in the mechanical movement. The relay R′ is not operatively energized, but it will be observed that the neutral relay $R^2$ receives current. The circuit 20—21—22 remains open, however, at the contact $r^8$. The movement of the magnet $SM^2$ may obviously be repeated as often as desired by repetition of the key movement. The selector and connector movements having been satisfactorily performed, the subscriber takes down his receiver T′, when the switch hook H immediately bridges the transmitter and receiver across the line wires 9 and 10, whereupon current will flow through the metallic circuit from the main battery B by the following path: wire 3, winding $r'$, wire 5, winding $r^3$, wire 9, impedance coil I, line wire 10, wire 13, switch hook H, wire 14, receiver T′ and transmitter T, wire 12, wire 7, magnet $R^2$, wire 6, winding $r^2$, wire 4, winding $r$, wire 2 and battery. It will be understood that the extensions 70 and 100 of the two line wires pass to the contacts of the selective apparatus, both of the present subscriber and of other subscribers, as will be sufficiently apparent from a study of the patent to which we have referred. Consequently when the connection is established by the successive acts we have described the line 7—10 becomes connected through the said extensions with the line $7^a$ and $10^a$ of another subscriber A′, the connection being indicated by dotted lines in the figure. The battery B is therefore bridged across the two connected metallic circuits at the points $x$—$y$, and in the bridge are included the coils I and $R^2$, whose impedance chokes back any voice currents that might otherwise pass into the bridge and hence to other lines by the various connections indicated at Z, the battery being common to the exchange. The differential relays may be disregarded, as their windings balance each other, so that we have a plain bridged battery with impedance coils, giving an ideal central energy circuit.

When it is desired to clear out, the subscriber depresses both keys K—K′, or in hanging up his telephone the same effect may be produced by an automatic mechanism, either mechanically on the keys, or electrically by closing the two ground wires 8 and 11. The effect of this double closure is to produce currents simultaneously in both line wires 7 and 10 from the two sides of the battery $b'$ and $b$. These currents are opposite in direction and unequal as to strength, and the inequality being in favor of the side 10 of the line, the magnetizing effect of the coils $r'$ and $r^3$ is sufficient to throw over the armature $r^5$ into operative contact with the points $r^8$ and $r^9$, the former thus closing one break in the circuit 20—21—22. The current in line wire 7, while insufficient to produce any effect upon the selective magnets energizes the magnet $R^2$ and thus closes the other break at $m'$ whereby the magnet RM is energized to release the switching mechanism, and the entire apparatus is restored to normal or zero position, to remain inoperative until another call.

In a system embodying our invention a central battery may be employed to furnish current both for selective purposes, such as operating the main switching apparatus, and for supplying the operating current for the telephone instruments, and by arranging the circuits in the manner shown, current impulses may be transmitted over the separate line wires to effect the different operations of the central office switching apparatus or impulses of current may be despatched over both line wires to form a compound circuit for restoring said apparatus.

It will be noticed that the ground battery and the polarized and neutral relays for operating the switch mechanism are included in the subscribers' lines at all times so that the battery flows through said relays as well as through the telephone instruments whenever a subscriber's line is closed, by removing the telephone from the hook, also at the same time upon grounding either side of the line in the manner employed by the Strowger system one of the polarized relays will respond to said grounding and operate the switch mechanism through its local contacts while upon the grounding of the other side of the line the other polarized relay will operate and through its local contacts operate to produce the other necessary movement of the switch as in the well known Strowger system while grounding both sides of the line will, by operating one of the polarized relays and the neutral relay, close the release circuit for releasing the switch exactly as in the Strowger system also that the subscriber's circuit which passed through the polarized and neutral relays to battery has no connection to the switch the impulses being produced by the operating devices of the Strowger system as above mentioned which are repeated from the local contacts of the relays into the switch mechanism for producing the successive operations by grounding the opposite sides of the lines for setting up a connection and the releasing operation by grounding both sides of the operating lines as in the well known Strowger system and while the lines thus have no direct connection to the switch mechanism they are indirectly connected for conversation in the usual way as indicated by the dotted lines at the top of Fig. 1.

It is well understood that as far as possible grounds should not be present on any part of a telephone circuit, and in case of a common battery system in particular the total destruction of a balance on many lines might be caused by grounds on one or a few by reason of their all being tied together at the battery terminals Z. In our system it will be noticed that the lines are only grounded at the subscribers' stations for brief periods and for selective purposes, the metallic circuits being free from grounds normally, except for the single ground wire (1) on the main battery, and as the battery is of very low internal resistance, this ground may be considered at a neutral point of the entire system, where it is incapable of doing any harm.

Having thus described our invention, what we claim and desire to secure by Letters Patent of the United States is:

1. In an automatic telephone exchange system, a central station, subscribers' stations and metallic circuits connecting the central station to the respective subscribers' stations, switching apparatus at the central station embodying electromagnetically-operated devices, a source of current supply connected in common to a plurality of subscribers' circuits to furnish energy both for the automatic control of the switching apparatus and for the subscribers' transmitters, and means whereby a constant difference of potential in the current supply may be maintained across said particular circuits for telephonic transmission purposes, and means also whereby variable potential differences in the current supply may be determined over the subscriber's line and between a subscriber's apparatus and the electromagnetic devices of the central office switching apparatus for operating the latter.

2. In an automatic telephone exchange system, a central station, subscribers' stations and a metallic circuit connecting each subscriber's station with the central station, switching apparatus at the central station, a common source of supply at the central station connected to the subscribers' circuits and to the central station switching apparatus, maintaining a constant potential difference on each subscriber's line for transmitter purposes, together with the means for producing a difference in polarity over the separate subscribers' line wires for actuating and restoring the switching apparatus.

3. In an automatic telephone exchange system, a central station, subscribers' stations and a metallic circuit interconnecting each subscriber's station with the central station, switching apparatus at the central station, a common source of supply at the central station connected in its entirety to maintain a maximum potential difference across each subscriber's circuit, and connected sectionally and unequally to the central station switching apparatus, together with means at the subscribers' stations, to determine a current flow across any given circuit for transmitter purposes, and separately to control the flow of current from the divisions or sections of the main battery to the switching apparatus to control the operation of the latter.

4. In an automatic telephone exchange system, a central station, subscribers' stations and a metallic circuit inter-connecting each subscriber's station with the central station, switching apparatus at the central station, a common source of supply at the central station bridged across a subscriber's circuit when in use and grounded at a point nearer one pole than the other, with connections from both poles of the source to the switching apparatus, and means at the subscribers' stations for connecting the telephone sets in metallic circuit, and means also for grounding the individual line wires whereby the automatic operation of said switching apparatus may be controlled.

5. In an automatic telephone exchange system, a central station, subscribers' stations, and a metallic circuit connecting each subscriber's station with the central station, switching apparatus at the central station, controlling magnets therefor, a source of current supply connected in common with all the lines both for operating the subscribers' transmitters, and the controlling magnets, connections from opposite sides of the source of current to said magnets and a ground connection on the source from a point intermediate of its terminals and nearer one terminal than the other, and means whereby grounds may be produced on opposite sides of the central station controlling magnets to affect the switching apparatus.

6. In an automatic telephone system, a central station, subscribers' stations and line circuits interconnecting them, a central station switching apparatus and differential controlling magnets therefor, a common source of current, means at the central station whereby a constant difference in potential may be produced by said source across the terminals of the subscribers' transmitters, and means at each subscriber's station whereby unequal differences of potential may be produced across the terminals of the controlling magnets at the central station.

7. In an automatic telephone exchange system, a central station, a subscriber's station and a line circuit interconnecting them, a switching apparatus at the central station and a plurality of differential controlling magnets therefor, a source of current, means at the central station whereby said source may be caused to maintain a constant potential difference across the subscribers' telephone terminals, and means at the subscriber's station whereby unequal differences of potential may be produced between the terminals of the several controlling magnets.

8. In an automatic telephone exchange system, a central station, subscribers' stations, and line circuits interconnecting them, a common source of current at the central station, a line switching apparatus and differential polarized controlling magnets therefor also at the central station, a connection from the source to ground from a point nearer one pole than the other, and connections from the source to the magnets and to the lines whereby current may be supplied to the latter for the transmitter and for switching purposes, means at the subscribers' stations for producing a flow of current from the unequal central station source through the central station controlling magnets in reverse directions to actuate the switching apparatus.

9. In an automatic telephone exchange system, a central office, subscribers' stations and metallic circuits interconnecting them, a line switching apparatus at the central office, having magnetically-operated controlling devices, local circuits therefor and polarized relays controlling said circuits, a common source of current at the central office grounded at a point nearer one pole than the other and connected to the subscribers' lines to maintain a potential difference across the same for transmitter purposes, connections from said source to the polarized relays, and means at the subscribers' stations for causing a flow of current in the ground and metallic circuits separately or together.

10. In an automatic telephone exchange system, a central station, subscribers' stations and metallic circuits connecting the central station with the individual subscribers' stations, a line switching apparatus at the central station, operating magnets therefor, polarized controlling relays for said magnets, a common source of current having its terminals connected to opposite sides of the subscribers' circuits and also to the said relays, said source having a ground connection intermediate of its terminals, together with means at each subscriber's station to cause a flow of current in the metallic circuit for transmitter purposes, and means for also grounding the individual line wires to transmit current in either or both of said line wires to control the polarized relays.

11. In an automatic telephone exchange system, a central station, a subscriber's station, a switching apparatus at the central station comprising magnets arranged in the two line wires of the subscriber's circuit, and a source of current at the central station supplying current to the subscriber's line and means at the subscriber's station to supply current from unequal portions of said source for controlling the switching apparatus.

12. In an automatic telephone exchange system, a line switching apparatus, a source of current unequally divided and grounded between the divisions, and a metallic circuit connected to the switching apparatus, an actuating magnet and a restoring magnet for the switching apparatus controlled through opposite sides of the metallic circuit, two polarized relays also controlled through said circuit, and a neutral controlling relay for the restoring magnet connected on the same side as the actuating magnet, and rendering the restoring magnet operative when energized, and whereby current through either side of the metallic circuit alone will fail to restore, but current through both sides will energize the restoring magnet.

13. In an automatic telephone exchange system, a central station, subscribers' stations and individual metallic circuits therefor, a line switching apparatus at the central station comprising vertical and rotary magnets and a restoring magnet, a pair of oppositely polarized relays differentially wound, a common source of current for all the circuits having its opposite terminals each connected through a similar winding on one of the polar relays to one side of the said several subscribers' circuits, a controlling relay for the restoring magnet, a circuit for the said restoring magnet and the vertical magnet closed by one of the polar relays on the passage of current in one direction therethrough, and a circuit for the rotary magnet and the said controlling relay closed by the other polar relay on the passage of current in the opposite direction, together with a ground connection from an intermediate point on the source of current and means at each subscriber's station to ground either or both of the individual wires of the metallic circuit.

14. In an automatic telephone exchange system a central station, subscribers' stations and individual metallic circuits therefor, a line switching apparatus at a central office, actuating magnets and a restoring magnet for said apparatus and a controlling relay for the restoring magnet, a pair of differentially wound oppositely polarized relays and a common source of current having its terminals connected each through one winding on both polarized relays, said source being also connected in parallel through the various windings of the polarized relays to and across the various subscribers' metallic circuits, a ground connection from said source at a point intermediate of its terminals and nearer one terminal than the other so as to produce sectional electromotive forces of unequal magnitude, together with means at each subscriber's station to bridge a talking set across the metallic circuit to derive transmitter current therefrom, and further means to ground either or both of the circuit wires, and connections at central office such that when neither line wire is grounded the polar relays will leave the circuits of the several switching magnets incomplete, when one wire is grounded one of the switch-actuating magnets and the controlling relay will be energized, and when the other line wire is grounded the other actuating magnet will be energized, the restoring magnet remaining inert, whereby the switching mechanism is operated, but when both line wires are grounded both the controlling relay and the restoring magnet receive current to restore the switching apparatus.

15. In an automatic telephone exchange system, a central station, a subscriber's station and a metallic line circuit interconnecting them, a line switching mechanism at the central station and a pair of oppositely-polarized controlling relays therefor having balanced differential windings, together with a switch-restoring device controlled thereby, a source of current at the central station having its terminals connected through similar windings on both polar relays to opposite sides of the subscriber's circuit and having an intermediate point grounded so as to divide the source into two unequal grounded sections, means at the subscriber's station to connect a telephone set across the metallic circuit to derive transmitter current therefrom without grounding the individual wires, whereby the polar relays will remain unaffected, and means also at the subscriber's station to ground either or both of the individual line wires at will, whereby the grounding of one wire at the subscriber's station will cause a flow of current in one direction to actuate one polar relay and the grounding of the other line wire will cause a flow of current in a reverse direction to actuate the other relay, but the grounding of both line wires will cause unequal and opposite currents to flow, producing a resultant effect of sufficient magnitude to cause the actuation of one only of the polar relays to restore the switching apparatus.

16. In an automatic telephone exchange, an automatic switch, operating and release magnets therefor, a battery at said exchange connected by metallic circuits, a pair of relays at said exchange adapted to be operated from said battery by impulses over the opposite sides of the line, means for repeating said impulses from said relays to said operating magnets, means to simultaneously ground both sides of the line to operate said release relay, and means for bridging said battery across the circuits for talking purposes without operating said relays to disturb said switch, as and for the purpose set forth.

17. In an automatic telephone system, the combination with an automatic switch of a metallic circuit line, a grounded common battery at the exchange bridged between the limbs of said line for talking purposes, and means at the substation for grounding the limbs of said line, one at a time, to operate said switch to establish a connection and to simultaneously ground both sides of the line for releasing said switch.

18. In an automatic telephone exchange, the combination with an automatic switch, of a common battery at the exchange for talking and operating purposes, switching means at the calling station for grounding either side of the line, relays at the exchange under the control of such means, said relays controlling the movement of said switch, a release circuit which is closed whenever both sides of the line are simultaneously grounded by said switching means and a release magnet operable by the closing of said circuit for releasing said automatic switch.

19. In an automatic telephone system, the combination with an automatic switching member 200, of a common battery at the exchange for talking and switching purposes, means at the calling station to ground either side of the line to control the movement of said switching member in establishing a connection and to simultaneously ground both sides of the line to return said switching member to its normal position.

In witness whereof I, the said Jacob W. Lattig, have hereunto set my hand this 23d day of June 1909, and I, the said Charles L. Goodrum, set my hand this 11th day of May 1909.

JACOB W. LATTIG.
CHARLES L. GOODRUM.

Witnesses for Jacob L. Lattig:
G. J. Cawood,
Thos. Fenton.
Witnesses for Charles L. Goodrum:
Beulah Straley,
Chas. I. Welch.

Copies of this patent may be obtained for five cents each, by addressing the "Commissioner of Patents, Washington, D. C."